Patented Nov. 17, 1953

2,659,726

UNITED STATES PATENT OFFICE 2,659,726

SUBSTITUTED FORMYLTETRAHYDROPTEROYL AMINO ACIDS AND METHOD OF PREPARING THE SAME

Donna B. Cosulich, Plainfield, N. J., assignor to American Cyanamid Company, New York, N. Y., a corporation of Maine No Drawing. Application April 8, 1952, Serial No. 281,221

8 Claims. (Cl. 260—251.5)

This invention relates to new substituted pteridines. More particularly, it relates to tetrahydro-5-formyl-10-alkylpteroic acids and methods of preparing the same.

A number of publications have appeared within the past year or two describing the existence of substances that stimulate the growth in a synthetic medium of Leuconostoc citrovorum. This unknown substance has been described as having activity similar to or identical with formyltetrahydropteroylglytamic acid. The substance has been found to replace the folic acid requirement of micro-organisms and chicks. It has also been found that it will reverse the toxic effects of aminopterin (N{4{[(2,4-diamino-6-pyrimido-[4,5-b]pyrazyl)methyl]amino}benzoyl}glutamic acid) in mice and bacteria under conditions in which pteroylglutamic acid is ineffective.

I have now found that certain substituted pteridines hereinafter described also have activity in inhibiting growth of certain bacteria, and therefore can be useful for this purpose. These new compounds of the present invention may be prepared by reduction and formylation of certain known compounds which have been previously prepared and most of which have been described in the literature. The starting materials that may be used in the process of the present invention to prepare the new compounds may be represented by the following structural formula:

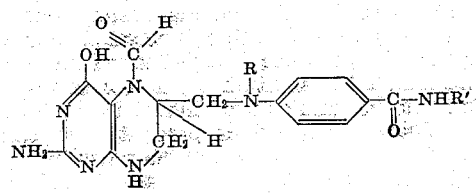

in which R is a lower alkyl radical and NHR' is the radical of an aliphatic amino acid. The compounds described above are reduced and subsequently formylated by reaction with formic acid in the presence of acetic anhydride or with an alkyl formimino ether in aqueous medium or other compounds capable of introducing the formyl radical into the 5-position of the above reduced compounds.

In the above formula NHR' is described as an aliphatic amino acid radical. This aliphatic amino acid is preferably glutamic acid or a peptide of glutamic acid, for example, glutamylglutamic acid; glutamylglutamylglutamic acid; hexaglutamylglutamic acid; glycylglutamic acid or the like. The aliphatic amino acid radical may however, be of another amino acid, aspartic, glycine, alanine, serine, or the like. Since the aliphatic amino acids contain carboxylic acid groups, obviously salts of these compounds may also be used in the process if desired. Similarly the final products may be obtained in the form of salts such as the alkaline earth metal salts.

The compounds of the present invention may be illustrated in one of their tautomeric forms by the following structural formula:

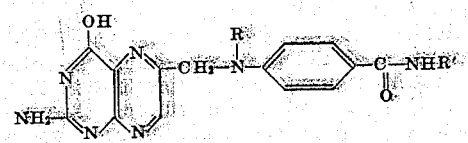

in which R is a lower alkyl radical and NHR' is an aliphatic amino acid radical.

The reduction of the compounds from which the new products of the present invention are prepared may be conducted either with or without the aid of catalysts. When using a catalytic reduction a wide variety of solvents may be used in the process including formic acid, alcohols, glycol, acetic acid and others, depending upon the nature of the catalytic agent. The presence of water in small amounts is permissible. The temperature of the reduction may occur over a wide range of temperatures of from 0° to about 100° C.

A number of catalysts commonly used in catalytic reductions may be employed in the process, for example, platinum oxide, palladium on charcoal, Raney nickel and others.

In general, the reaction occurs rapidly and appreciable yields of the tetrahydropteridine intermediate can be obtained in as little time as 10 minutes at room temperature using, for example, hydrogen with platinum oxide catalyst in formic acid. The reduction is usually complete within a period of 30 minutes to about two hours.

After the reaction is complete the introduction of the formyl group yields the desired compound, which can be purified by several methods, for example, reprecipitation from a solvent, chromatography on absorbents such as magnesium silicate or starch, and isolation of the product as the calcium or barium salts which are soluble in water but have a limited solubility in aqueous alcohol.

The following examples describe a method for the preparation of a 5-formyl-10-alkylpteroyl aliphatic amino acid and certain salts thereof. All parts are by weight unless otherwise indicated.

Example 1

A solution of 24.8 parts of 10-methylpteroylglutamic acid in 350 parts by volume of 98–100% formic acid is reduced over 0.75 part of platinum oxide catalyst at 0° C. The absorption of two moles of hydrogen is complete in an hour. The reaction mixture is treated with 35 parts by volume of acetic anhydride and allowed to stand twenty-four hours under a nitrogen atmosphere. After removal of the catalyst by filtration the formic acid solution is added with stirring in 3500 parts by volume of ether. The solid is allowed to settle and the supernatant decanted. The material is washed with ether several times by decantation, filtered and washed well with ether. The air-dried solid weighs 14.6 parts.

The calcium salt is prepared by dissolving 12.8 parts of the above material in 70 parts by volume of 1 N sodium hydroxide and after adjusting the slightly turbid solution to about pH 7.5, adding a solution of 3.9 parts of calcium chloride in 12.8 parts by volume of water. To remove considerable colored impurity, the solution is stirred for about 5 minutes with 5.1 parts of magnesium silicate. The filtered soltuion is then added slowly with stirring to 420 parts by volume of ethanol. The precipitated calcium salt is filtered, washed and dried to yield 10.8 parts.

A 10% aqueous solution of 4.3 parts of the calcium salt is placed on a magnesium silicate column (100 parts). Elution is accomplished by water and the presence of the desired material is determined by addition of a few drops of barium chloride and excess ethanol to a portion of the eluate; a flocculent precipitate is considered a positive test. About 800 parts by volume of eluate is collected before any flocculence is detected in the test. A total of 1550 parts by volume is obtained which gives a positive test. This is concentrated under reduced pressure to a small volume and the concentrate, after being made alkaline, is filtered to remove silicates. After adjusting the pH of the filtrate to 7–8, 1.3 parts by volume of 33% aqueous calcium chloride solution is added. The resulting solution (11 parts by volume) is added, with stirring, to 65 parts by volume of ethanol. After a short cooling period, the calcium salt is filtered, washed and dried to yield 0.285 part. A total of 8.0 parts of the crude calcium salt is chromatographed as indicated above and the products are combined to give 2.0 parts of purified calcium salt.

To effect further purification, 1.4 parts of the calcium salt obtained thus is purified on a column as before, using 20 parts of magnesium silicate. The eluates containing the desired material are concentrated and the calcium salt isolated as described. This calcium salt is recrystallized twice by warming in water and diluting slowly with alcohol to give small tablets aggregated in rosettes. The dried material weighs 0.434 part.

*Example 2*

A small portion of the calcium salt prepared in Example 1 is converted to the free acid by adjustment of its aqueous solution to pH 3.48 and cooling. The 5-formyl-10-methyltetrahydropteroylglutamic acid precipitates in the form of small beads collected in aggregates.

I claim:

1. A compound of the group consisting of those having the formula:

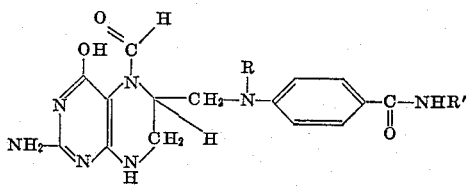

in which R is a lower alkyl radical and NHR' is an aliphatic amino acid radical of the group consisting of glutamic acid and adjacent homologs and alkaline earth metal salts thereof.

2. A compound having the formula:

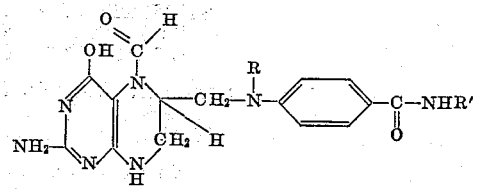

in which R is a lower alkyl radical and NHR' is a glutamic acid radical.

3. 5-formyl-10-methyltetrahydropteroylglutamic acid.

4. Calcium 5-formyl-10-methyltetrahydropteroylglutamate.

5. A process of preparing a compound having the formula:

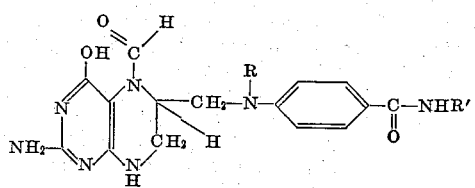

in which R is a lower alkyl radical and NHR' is an aliphatic amino acid radical of the group consisting of glutamic acid and adjacent homologs which comprises subjecting a 10-alkylpteroyl aliphatic amino acid to the action of hydrogen and a reducing agent until two molecular equivalents of hydrogen are absorbed, formylating the reduced pteridine in the 5-position and separating the said compound.

6. A process of preparing compounds having the formula:

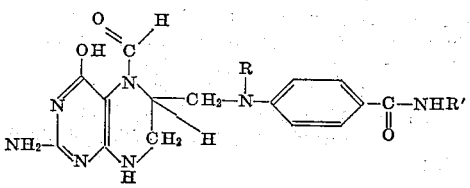

in which R is a lower alkyl radical and NHR' is a glutamic acid radical which comprises subjecting a 10-lower alkylpteroylglutamic acid to the action of hydrogen and platinum oxide until two molecular equivalents of hydrogen are absorbed, formylating the reduced pteridine in the 5-position and separating the said compound therefrom.

7. In a process of preparing a 5-formyl-5,6,7,8-tetrahydro-10-lower alkylpteroylglutamic acid the step which comprises formylating a 5,6,7,8-tetrahydro-10-lower alkylpteroylglutamic acid and recovering said compound therefrom.

8. A process of preparing 5-formyl-10-methyltetrahydropteroylglutamic acid which comprises subjecting 10-methylpteroylglutamic acid to the action of hydrogen and platinum oxide until two molecular equivalents of hydrogen are absorbed, formylating the reduced pteridine in the 5-position and separating said compound therefrom.

DONNA B. COSULICH.

No references cited.